United States Patent [19]
Bacigalupo et al.

[11] Patent Number: 6,032,178
[45] Date of Patent: Feb. 29, 2000

[54] METHOD AND ARRANGEMENT FOR DATA TRANSMISSION BETWEEN UNITS ON A BUS SYSTEM SELECTIVELY TRANSMITTING DATA IN ONE OF A FIRST AND A SECOND DATA TRANSMISSION CONFIGURATIONS

[75] Inventors: Tommaso Bacigalupo, San Jose, Calif.; Michael Erdmann, München; Peter Rohm, Pfaffenhofen, both of Germany

[73] Assignee: Siemens Aktiengesellschaft, Munich, Germany

[21] Appl. No.: 09/005,696

[22] Filed: Jan. 12, 1998

[51] Int. Cl.[7] ...................................................... G06F 13/00
[52] U.S. Cl. ......................... 709/208; 709/200; 709/209; 709/227; 709/232; 709/245; 710/4; 710/11; 710/14; 710/20; 710/21; 710/33; 710/110; 710/129; 710/131
[58] Field of Search ................................... 709/200, 208, 709/209, 227, 232, 245; 710/4, 11, 14, 20, 21, 33, 110, 129, 131

[56] References Cited

U.S. PATENT DOCUMENTS 5,828,852 10/1998 Niedermeier et al. ................... 710/110

*Primary Examiner*—Meng-Ai T. An
*Assistant Examiner*—Nabil El-Hady
*Attorney, Agent, or Firm*—Herbert L. Lerner; Laurence A. Greenberg

[57] ABSTRACT

The invention relates to a method and an arrangement for operating a bus system having at least one master unit and at least one slave unit, having a bus and a bus control unit for the bus arbitration and for controlling the data transfer. The data transmission is split into a request data transfer and a response data transfer, and, in the time between the request data transfer and the response data transfer, the bus is cleared for the data transmissions of other master units in a first data transmission configuration, or the bus is blocked between the request data transfer and the response data transfer, in a second data transmission configuration and slave units. In the case of a response transfer, the master and slave are changed round.

29 Claims, 4 Drawing Sheets

METHOD AND ARRANGEMENT FOR DATA TRANSMISSION BETWEEN UNITS ON A BUS SYSTEM SELECTIVELY TRANSMITTING DATA IN ONE OF A FIRST AND A SECOND DATA TRANSMISSION CONFIGURATIONS

The present invention relates to a method as claimed in the preamble of patent claim 1 and an arrangement as claimed in the preamble of patent claim 18, i.e. a method and an arrangement for operating a bus system comprising (1) at least one primary unit, (2) at least one secondary unit, (3) a bus between the primary unit and the secondary unit having at least one address bus, at least one data bus and at least one control line and (4) at least one bus control unit controlling the bus and controlling at least one data transmission between a primary unit, allocated to the bus, and the secondary unit addressed by this primary unit, (5) the data transmission being carried out in a first configuration or in a second configuration.

Bus systems for microprocessors, in particular for microcontrollers, in which a bus system is provided for connecting peripheral units to a processor core, are disclosed, for example, in Elektronik Report 10a, October 1990. In that publication, pages 58ff., particularly page 59 and the associated figure, show the basic structure of such a microprocessor. The microprocessor described comprises a central processing unit (core processor) and various peripheral units (serial I/O, timer, DMA controller). All the units are connected to one another by means of an internal bus (intermodule bus). In addition, a bus control unit (system interface) is provided which connects an external connectable bus to the internal bus.

A peripheral unit connected to this bus is usually accessed such that the accessing functional unit, which is usually the central processing unit or another bus master, applies to the address bus the addresses of the peripheral unit to be addressed and applies to the data bus the data to be transmitted. The data transmission then takes place in a wide variety of ways by means of control signals. In a bus system operating in demultiplexed mode, the address signals are simultaneously transmitted on associated address lines. In bus systems operating in multiplexed mode, part of the address can be applied to the data bus and temporarily stored by a memory in the peripheral unit. The remainder of the address is then transferred to the address lines of the address bus.

If the respective address is available, the associated peripheral unit is selected and the corresponding data are applied to the data bus by the central processing unit or the addressed peripheral unit, depending on whether a write operation or a read operation is taking place. In the course of the actual data transmission, the subsequent addresses must be constantly available on the address bus so that a valid data transmission is ensured.

However, if very fast central processing units are used, such as RISC processors, then the transmission rate on such buses is frequently not high enough. Higher and higher transmission rates are therefore being sought after.

DE 43 17 567 A1 discloses a generic method of operating a bus system and an arrangement for carrying out the method. The bus system described in that publication has a master unit which communicates, under the control of a bus control unit, with a slave unit via a bus. If a number of master units are present, the bus control unit controls the bus arbitration, that is to say the allocation of the bus to one of the master units, and the monitoring of the data transmission in the event of any time overrun. The actual data transmission is then carried out in the respective active master unit and the slave unit addressed by it. In this case, a multiplicity of control lines are used to transmit the characteristics of a bus cycle, such as the data length, access to the data or control area, wait cycle, time-out etc., in coded form.

With the integration of microcontroller and microprocessor systems on a chip (system-on-chip) becoming increasingly complex, however, communication between the various components of the system is becoming a decisive criterion for the performance of the whole system. Such a bus system typically links more and more primary units (master units) and secondary units (slave units). The communication of these so-called multi-master units with the various slave units and peripheral units via the bus is therefore becoming more and more complicated. This means that a more intelligent and more flexible protocol is required for operating the bus and the units linked to the bus system.

On the basis of this prior art, it is therefore the object of the present invention to specify a method and an arrangement for operating a bus system, which enables more flexible data transmission between the units connected to the bus system.

The invention achieves this object by providing the features claimed in the descriptive parts of patent claims 1 and 18. Accordingly, the following are provided:

in the first configuration, the data transmission is split into a request data transfer and a response data transfer, and, in the time between the request data transfer and the response data transfer, the bus is cleared for the data transmissions of other primary units and secondary units, and, in the second configuration, the bus is not cleared between the request data transfer and the response data transfer, and at least one of the units linked to the bus system has a logic circuit for requesting, rejecting and selecting the data transmission in the first configuration or in the second configuration.

Refinements and developments are defined in the other subclaims.

The invention is explained in more detail below using the exemplary embodiments specified in the figures of the drawing, in which.

Figure 1:
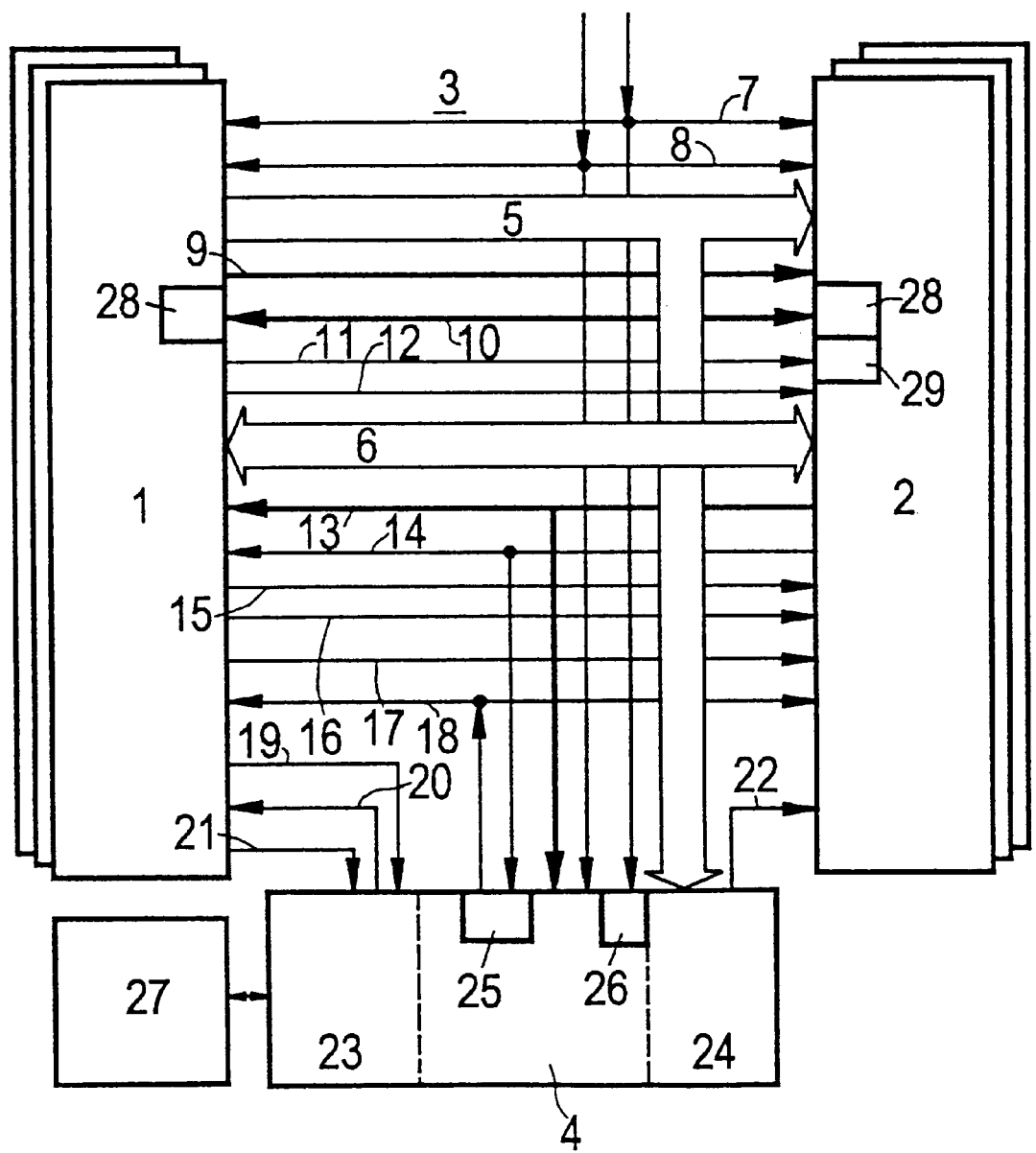
FIG. 1 shows a basic block diagram of an arrangement according to the invention.

FIG. 1 shows a basic block diagram of a bus system according to the invention. The bus system has a primary unit 1 and a secondary unit 2. In the following text, the primary unit 1 is called a master unit and the secondary unit 2 is called a slave unit. The master unit 1 can in this case be represented by a central processing unit, such as a RISC processor. By way of example, the slave unit can be formed by any type of peripheral unit, memory unit or the like. In this case, a peripheral unit can be designed both as a slave peripheral unit and as a master peripheral unit. It would thus also be conceivable for a slave unit 2 likewise to be formed by a central processing unit or by a coprocessor.

As indicated in FIG. 1, a number of master units 1 and a number of slave units 2 can be linked to the bus system. Such systems, in which a number of master units are linked to an individual bus 3, are also called multi-master bus systems. The number of master units 1 and slave units 2 depends on the system and is not defined further.

The master units 1 and the slave units 2 are connected to one another by means of a bus 3. The bus 3 contains a multiplicity of address lines, data lines and control lines. In addition, a bus control unit 4 carrying out arbitration and control of the bus 3 is provided between the master units 1 and the slave units 2.

6 denotes a data bus and 5 denotes an address bus. The data bus 6 is operated bidirectionally between the master units 1 and the slave units 2. The address bus 5, on the other hand, is typically operated unidirectionally between the master units 1 and the slave units 2 as well as the bus control unit 4. In addition, the bus 3 has a multiplicity of control lines 9 . . . 22 which are used to control data transmission. Furthermore, the bus system has a clock line 7 and at least one reset line 8.

A more detailed description of the bus lines of the bus system and the signals transmitted on them is provided below:

System Signals:

Clock line 7:

Clock signal (CLK signal); by means of the clock line 7, the bus clock can be input into each of the units linked to the bus system. The bus clock can be used as a reference for the timing of the signal sequences via the bus 3. This means that, by means of the bus control unit 4, the bus 3 can, at any one time, be allocated to only one of the master units 1 in one clock period.

Reset line 8:

Reset signal (RES signal); the reset signal generated can be used to reset the units linked to the bus system. In the startup phase, the reset signal may be asynchronous, whilst in normal operation it is activated in synchronism with the clock signal 1. The reset signal is typically always deactivated in synchronism with the clock, however.

Signals of the Bus Control Unit 3:

Control line 19:

Bus request signal (REQ signal); a master unit 1 uses the bus request signal to place a request with the bus 3 at the start of a bus cycle for data transmission with a slave unit 2. If a number of master units 1 are linked to the bus system, each of the master units 1 has a separate line to the bus control unit 4.

Control line 20:

Bus grant signal (GNT signal); an arbitration unit 23 inside the bus control unit 4 uses this grant signal to notify the master unit 1 of when it is authorized to access the bus 3 and when it can begin the data transmission.

Control line 21:

Lock signal; a master unit 1 can use this so-called lock signal to carry out successive bus cycles without the data transmission being interrupted by one or more other master units 1.

Control line 22:

Slave select signal (SEL signal); the slave select signal is used to select a slave unit 2. For this purpose, each unit which can be addressed as a slave unit 2 via the bus 3 has a signal input into which the slave select signal can be input for selecting the respective slave unit 2 during a data transmission.

Address and Data Signals:

Address bus 5:

Address signal (A signal); the address signals on the address bus 5 are driven by the master unit 1 involved in a data transmission. These address signals are then input into an address decoder 24 of the bus control unit 3. On the basis of this address signal, the slave select signal is then produced for selecting the corresponding addressed slave unit 2. In this case, not all the address lines are necessarily employed for generating the slave select signal, but typically only the necessary number of upper address lines.

In addition, a partial address can be input directly into the corresponding slave unit 2 via some of the address lines 5. The address length of the address bus 5 can in this case be 8, 16 or 32 bits. For simplicity, it is assumed below that the address bus 5 has an address length of 32 bits. This address is input into the address decoder 24 whilst the number (2 to n) of bits required for internal addressing are input directly into the slave unit 2.

Data bus 6:

Data signal (D signal); the data signals on the data bus 6 are driven bidirectionally either by the master unit 1 or by the slave unit 2. The data direction depends upon whether the master unit 1 is writing data to the data bus 6 (write mode) or reading data from the data bus 6 (read mode) during a bus cycle. The number of data lines 6 in the data bus, or the data bus length, can be 8, 16, 32 or 64 bits, depending on the system implementation. It is assumed below that the data bus 6 has a data bus length of 32 bits.

Control Signals:

Control line 9 (ID bus):

TAG signal; in order to carry out a data transfer, the master unit 1 sends a so-called identification signal (TAG signal) to the addressed slave unit 2. This identification signal is used to address the correct bus user for the response. This ensures that each of the master units 1 is in each case involved in a maximum of only one data transfer at the same time. The bus length of the ID bus thus also limits the maximum number of master units 1 linked to the bus system. In the present case, the bus is a 4-bit ID bus. This means that a maximum of 16 master units 1 can be linked to the bus system.

Control line 10 (operation code bus):

Operation code signal (OPC signal); the master unit 1 uses the operation code signal to transmit additional characteristics of a bus cycle in coded form. Such characteristics can be, for example, the size of the data unit transmitted (8/16/32/64 bits), wait states, data transfer split into request data transmission and response data transfer (split blocks), duration of the interruption between the request data transfer and the response data transfer, acknowledge signals, etc. The control lines of the operation code bus 10 are driven by the respective master involved in the data transmission. In the case of a split data transfer, this means that the addressed slave unit 2 can also drive the operation code bus 10, the slave unit 2 functioning as a master here.

The operation code bus denoted by 10 can comprise a number of individual signal lines, e.g. four individual lines (4 bits), depending on the number of coded operation code signals.

Control line 11:

Abort signal; this abort signal can be used to cancel again or abort a data transmission which has already begun.

Control line 12:

Supervisor signal (SVM signal); this supervisor signal distinguishes whether the master unit 1 involved in the data transmission is being operated in the so-called supervisor mode or in the user mode. The user mode and the supervisor mode are two different access levels: registers and addresses which have supervisor mode access cannot be written to or read from in user mode. In this case, an error message must be emitted. Registers and addresses which have user mode access can be written to or read from in supervisor mode without difficulty. The supervisor mode is therefore superior to the user mode. Hence, the current bus master uses the SVM signal to indicate which of these modes it is currently operating in.

Control line 13 (ACK bus):

Acknowledge code signal (ACK signal); this acknowledge signal is produced by the slave unit 2 involved in a data transfer. This slave unit 2 uses the acknowledge signal to indicate whether, for example, valid data are available, whether data have been processed, whether wait cycles are being inserted, whether error states have occurred in a current bus cycle, etc. The acknowledge signals on the control lines 13 are typically transmitted in coded form. In the present case, the ACK bus 13 is 2 bits long.

Control line 14:

Ready signal (RDY signal); the acknowledge signal on the control line 14 is driven by the slave unit 2 involved in a data transmission and identifies the end of the corresponding data transmission. If the data transmission takes place using wait states, that is to say not using split blocks, the control line 14 can also be deactivated.

Control line 15:

No-split signal; this signal, which is driven by the master unit 1, can be used to enforce a data transmission by wait states, i.e. the data transfer does not then take place in split blocks.

Control lines 16, 17:

Write/read signals (WR/RD signals); at the beginning of a bus cycle, a master unit 1 uses the read signal or the write signal to indicate to the slave unit 2 addressed via the slave select signal 22 whether data are being transmitted from or to this slave unit in this bus cycle. The write/read lines 16, 17 are driven by the master unit 1 involved in the data transmission.

In a particular, advantageous embodiment, a special read/change/write mode can also be provided in this case. The slave unit 2 is informed of the performance of such a special data transfer via read/write control lines 16, 17. It can then protect the bits which have not been changed. For example, if only one bit has been changed, then only this bit is written back as well, so that changes which have occurred in the meantime in the other bits are not lost.

Control line 18:

Time-out signal (TOUT signal); the bus control unit 4 uses this time-out signal to abort a data transmission which has already begun between the master unit 1 and the slave unit 2, for example owing to the bus being accessed for a time which is unacceptably long for the system. If the time-out signal is set active, the master unit 1 involved in the data transmission and the slave unit 2 must deactivate or switch off their signal lines which have been activated. The time of bus occupancy which determines when switching off takes place, i.e. the number of clock cycles, can be defined to be fixed or variable in the bus control unit 4.

The elements of the bus system and their function are explained in more detail below.

In the present example, a multiplicity of master units 1 and slave units 2 are linked to the bus system. The master unit 1 therefore has a master interface and the slave unit 2 has a slave interface to the bus 3. However, it would also be possible for a master unit 1 to function as a slave unit 2 and for a slave unit 2 to function as a master unit 1 as well. Such units are called master/slave units and have a master/slave interface to the bus 3. It is particularly advantageous to use master/slave units instead of master units 1 since this only requires a slightly larger implementation effort but considerably increases the functionality and the flexibility of this master unit 1.

Master units 1 and slave units 2 communicate with one another by means of the address bus 5 and by means of the control signals on the control lines 10, 16, 17, 21 (from the master to the slave) as well as by means of the control signal on the control line 13 (from the slave to the master).

The maximum address bus length typically depends on the system memory. A master unit 1 must in this case be connected to all the address lines of the address bus 5. On the other hand, a slave unit 2 need be connected only to those address lines of the address bus 5 which it requires for the internal decoding of the address signal in each case. In the present example, the slave unit 2 requires only 4 bits, i.e. four address lines, for decoding the respective address signal.

The maximum data length of the data bus is determined by the maximum size of the largest data type which is to be transmitted by means of the data bus 6 in the course of a data transmission. Typical data types are, for example, 1 byte (8 bits), 1 half-word (16 bits), 1 word (32 bits) and 1 double word (64 bits). In this case, the minimum data length is determined by the data size of the central processing unit. It is also possible, particularly for transfering small data sets to peripheral units, for example, to reduce the number of data lines in the data bus 6 for these slave units 2. However, the reduction in the data lines must be accounted for in the address of the addressed slave unit 2.

A data transmission on the data bus 6 always takes place between a master unit 1 and a slave unit 2. After the bus 3 has been allocated by the bus control unit 4, the master unit 1 selects the slave unit 2 required for the data transmission by means of an address which is transmitted on the address bus 5. This address can be decoded centrally by means of the address decoder 24 in the bus control unit 4 or locally in a special address decoder in the slave unit 2. For this purpose, each unit which can be addressed as a slave unit 2, i.e. this may also be a master unit 1 (a so-called master/slave unit, for example), must provide an input for inputting the select signal for the control line 22.

The bus 3 can be operated in such a manner that the addresses can be transmitted on the address bus 5 in non-multiplexed mode or on the address bus 5 and the data bus 6 in multiplexed mode. The transmission of the addresses in multiplexed mode and/or in demultiplexed mode is typically selected by the bus control unit 4 or the corresponding master unit 1. In the present exemplary embodiment, however, it is assumed that the bus 3 is operated in demultiplexed mode.

The bus control unit 4 typically contains an internal arbitration device 23 and an address decoder 24. It would also be conceivable, however, for the arbitration unit 23 and/or the address decoder 24 to be arranged in one of the primary master units 1 or slave units 2.

The bus control unit 4 is fed the signals from the address bus 5, control signals from the control lines 13, 14, 18, the clock signal from the clock line 7 and a reset signal from the reset line 8. The arbitration unit 23 uses the control lines 19, 20 to control the allocation of the bus 3 (arbitration). For this purpose, the bus control unit 4 and the arbitration unit 23 are connected to each of the master units 1 by means of a pair of signals from the control lines 19, 20 in each case.

In addition, the arbitration unit 23 has prioritization logic. This is of great significance, particularly in a multi-master bus system. The prioritization logic in the arbitration unit 23 decides which master unit 1 can access the bus 3 and with what priority.

In addition, the bus control unit 4 can have a time-out controller 25 and a reset controller 26.

The time-out controller 25 is activated by means of the ready signal from the control line 14. In a known manner, bus operation of the units involved in a data transmission can be aborted by means of a so-called time-out mechanism.

The reset controller 26 can be used to set all the address, data and control lines 5, 6, 9 . . . 22 of the bus 3 to a prescribed value. It would also be possible for the reset controller 26 to be arranged in one of the master units 1 or one of the slave units 2.

In addition, the bus system can contain means for power management 27. These means for power management are of particular significance, especially in systems which rely on a local voltage supply, such as a battery or an accumulator. The means for power management 28 can have a number of operating modes. The simplest operating mode is the sleep mode. In sleep mode, the signal lines of the bus 3 are simply switched off. In the present example, this is performed via the bus control unit 4. A further option is the slow-down mode. In slow-down mode, the power consumption of all the units linked to the bus system is reduced and hence unwanted charging and/or discharging of the bus lines is prevented. In particular, the frequency at which the bus signals change state is reduced in slow-down mode. This leads to a reduction in current consumption. The voltage remains unchanged, however. The power consumption is therefore markedly reduced in both modes.

Furthermore, the bus system contains a default master. The default master is in this case typically formed by one of the master units 1. The default master is given access to the bus if no other unit is requesting the bus 3. In this case, the default master ensures that corresponding "dummy transfers" take place on the bus 3. Amongst other things, this serves to reduce the current consumption.

The provision of a default master has the advantage that, if a data transmission is intended later, the default master can carry out a data transfer without a request signal, via the control line 19. In this manner, a complete clock cycle can be saved. Typically, the central processing unit (CPU), for example, is chosen as the default master. It would also be conceivable, however, for the master unit 1 which was last involved in a data transmission to keep the access authorization to the bus 3 as the default master in each case.

Inventively, the bus system which is presented as novel can be operated by means of two fundamentally novel and different operating modes. In the first mode, the data transmission takes place in split blocks (split transfer) whilst, in the second mode, the data transmission does not take place in split blocks (non-split transfer) as described in the prior art.

With split transfer, the data transmission is divided into two transfer blocks, the so-called request transfer and the so-called response transfer. With the request transfer, information such as the destination address, amount of data and master identification (Master ID) are conveyed from a master unit 1 to the addressed slave unit 2. This request transfer typically lasts for only one clock cycle. The request transfer and the response transfer are separated by at least one bus cycle.

In this intervening period, the addressed slave unit 2 collects the requested data internally and prepares them for the response transfer. In the period intervening between this request transfer and the response transfer, the bus is again available to other units linked to the bus system. This means that at least one other data transfer can take place in this intervening period.

In the course of the response transfer, the addressed slave unit 2 then takes over control of the bus 3 and thus functions as a master. As a master, the slave unit 2 then sends the requested data to the master unit 1, identified by the TAG signal, which has requested the transfer. Hence, this master unit 1 functions as a slave. The TAG signal in this case has the substantial task that the receiving unit can recognize the response transfer on the bus 3 as being intended for itself, since the bus 3 has been cleared in the meantime and other master units 1 have been able to access the bus.

The split transfer can thus be identified by this change-around of master and slave and by the bus 3 being cleared in the period intervening between the request transfer and the corresponding response transfer for other units linked to the bus system.

The response transfer of the slave unit 2 functioning as a master can be interrupted at any time and continued again at a later instant. For example, at the instant when the data transmission is interrupted, a data tranmission from another master unit 1 and slave unit 2 can take place. In order that the data transmission can be duly continued again after an interruption, both the master unit 1 and the responding slave unit 2 must be able to recognize an interruption as such. Furthermore, both units 1, 2 must be able to recognize which of the data have already been sent and which have not yet been sent, so that, after the interruption, the data transmission can be continued straight away at the end of the last data block sent. The end of a data transmission is identified by a special code on the OPC bus 10. If a data transfer is not to be interrupted, it can also be locked by means of a lock signal at any time.

It is naturally also conceivable for a number of split-transfer data transmissions to be open at the same time, because the corresponding slave units 2 collect the data in parallel. It is also conceivable for individual slave units 2 to have a number of split transfers open. Priority for processing the individual split transfers depends on a number of criteria and on the system requirements. In the present example, each slave unit 2 can have only one split transfer open. Priority is specified such that the first request is also processed first. Methods are also available for aborting the processing of open split transfers or starting it with new conditions.

A further reason why a data transmission may not be able to take place or be continued is, for example, that the addressed slave unit 2 is locked or the corresponding register cannot supply the data at the desired rate. Typically, but not necessarily, in each case one master unit and in each case one slave unit 2 process only a single split data transfer.

In non-split transfer, the data transmission can be carried out, for example, in blocks of defined length or in individual transfers. In both cases, a dynamic number of wait states are supported. The novel bus system is preferably operated with the different operation modes as a supplement. The different methods of operating the bus system can in this case operate the bus system on its own or alternately depending on requirements. This means that the novel bus system is as flexible as possible.

Figure 2:
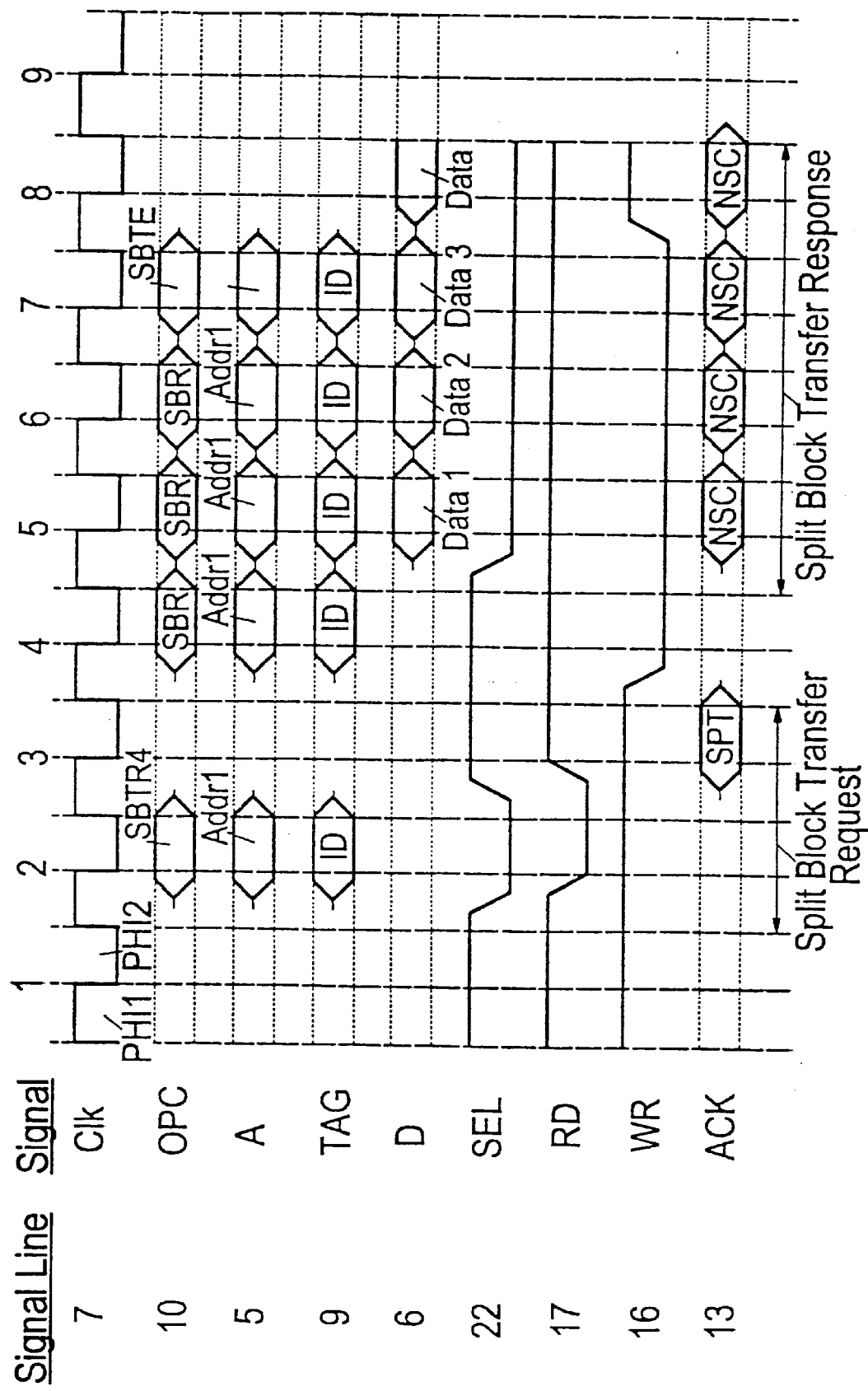
FIG. 2 shows a time characteristic of various signals on the signal lines of the bus system according to the invention.

The data transmission according to the invention using split transfer and non-split transfer is explained in more detail below with the use of a signal timing diagram. FIG. 2 shows the time characteristic of various signals for a data transmission using split transfer.

FIG. 2 shows the transmission of four cohesive data units (32 bits) from a slave unit 2 to a master unit 1. The clock signal CLK on the clock signal line 7 is used as a reference for the timing on the bus 3. The bus 3 is in the standby state before and after a data transmission on the bus 3, i.e. in the first clock cycle and in the ninth clock cycle.

In the second clock cycle, the bus control unit 4 allocates the bus 3 to the master unit 1. The master unit 1 begins the data transmission and drives various control signals on the control lines 9, 10, 16, 17, 21 and the address bus 5. During the second clock cycle, the address information on the address bus 5 is decoded centrally in the slave unit 2 or locally in the bus control unit 4 or in its address decoder 24. The OPC signal (SBTR4 =Split-Block Transfer Request (4 transfers)) is used to send the request for a split transfer in 4 blocks to a slave unit (Addr 1) via the control lines 10. The master unit 1 is identified by a TAG signal (ID). Thereafter, the bus 3 is cleared again for the third clock cycle.

In the third clock cycle, the addressed slave unit 2 acknowledges, by means of an ACK signal (SPT=Split Transfer) on the control line 13, the request of the master unit 1 for a split data transmission.

In the fourth clock cycle, the slave unit 2 which has had a request for the split transfer now functions as a master. This does not necessarily presuppose, however, that this slave unit 2 already has the requested data set available. At the beginning of the fourth clock cycle, the slave unit 2 begins to drive the address bus 5 and the signals on the corresponding control lines 10, 11, 12, 16. In accordance with the pipeline architecture, the data are driven shifted by one cycle. There are therefore a number of successive write procedures. The slave unit 2 then begins the response transfer by means of the OPC signal (SBR=Split-Block Response), which indicates to the corresponding identified master unit 1 that the data response is currently being sent. The master unit 1 is in this case identified by the TAG signal (ID). At the same time, the control line 16 is set active by the write signal.

It would also be possible for the response transfer of the sending slave unit 2 to take place at a later instant, for example when another data transfer with a higher priority is to be processed beforehand.

In the fifth and sixth clock cycles, the first two data blocks (data 1, data 2) are sent via the data lines 6. In this case, however, the sending slave unit 2 does not have to have the entire data set to be sent available yet. At this instant, only the first two data blocks have to be in the right register of the slave unit. The receiving master unit 1 uses the ACK signal (NSC=No Special Condition) to acknowledge that the data or error states signaled have been received correctly.

In the seventh clock cycle, the third data block (data 3) is sent. At the same time, the slave unit 2 uses an OPC signal (SBRE=Split-Block Response End) to end the response transfer to the previous master unit 1. This signal denotes the last transfer of the response transfer. The data in the subsequent bus cycle are therefore the last to be sent.

In the eighth clock cycle, the fourth and last data block (data 4) is transmitted and the bus 3 is cleared again in the ninth clock cycle.

The pipelining system can be seen particularly well in FIG. 2. In the fourth clock cycle, the address and the signals on the control lines 9, 10, 16, 17 are emitted. The data transmission for this cycle takes place one clock cycle later.

In FIG. 2, the master unit 1 is requesting a data transfer with split transfer. It would also be conceivable, however, for the addressed slave unit 2 to reject the data transmission using split transfer and to change it to a data transmission comprising a number of individual data transfers. This is done using the corresponding ACK code.

A further possibility arises when the master unit 1 requests a data transmission using non-split transfer but the addressed slave unit 2 rejects this non-split transfer and specifies a data transmission using split transfer.

Finally, it is also possible for the master unit 1 to enforce a data transmission using non-split transfer by means of a special control bit (no-split signal) on the control line 15. In addition, the slave unit 2 has the option of rejecting these transfers on the basis of other priorities.

In order to fulfill these requirements, the master units 1 and slave units 2 according to the invention must have a logic circuit 28. This logic circuit 28 can request, reject and select a data transmission using split transfer or using non-split transfer. In addition, this logic circuit 28 contains means for timing the data transmission.

In the present exemplary embodiment, the secondary units 2 have a buffer memory device 29. In this case, the buffer size should be chosen to be large enough for it to be possible to process the data response transfers at an optimum rate.

The buffer memory device 29 is necessary when a data transmission is aborted by the abort signal during the data transfer. Following abortion, the preceding data must be available again.

Figure 3:
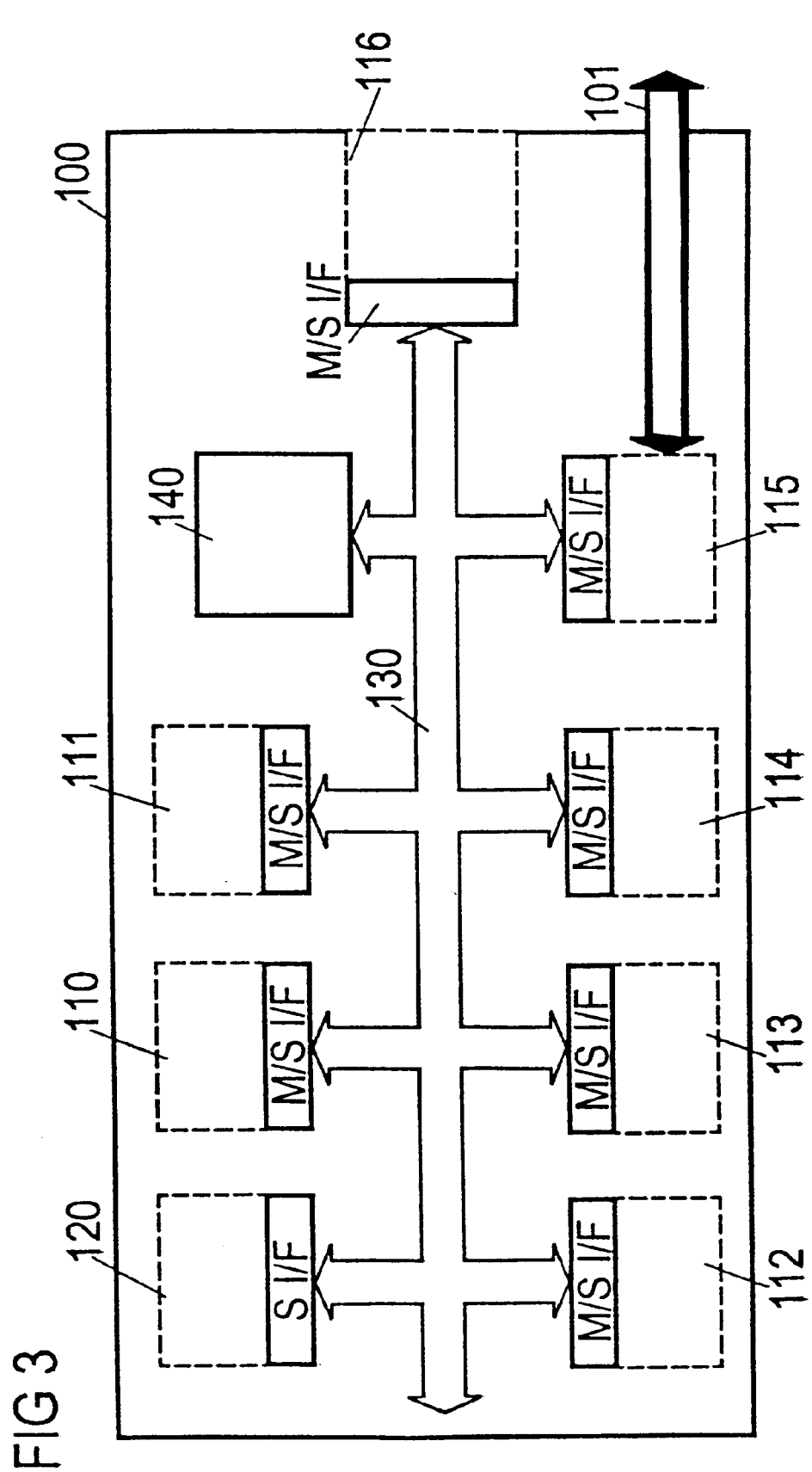
FIG. 3 shows an advantageous exemplary embodiment for implementing the bus system according to the invention.

FIG. 3 shows an example of an advantageous implementation of the bus system according to the invention.

The bus system according to the invention is in this case implemented as a so-called system-on-chip on a semiconductor component 100. In FIG. 3, 130 denotes the bus. A total of seven master units 110 . . . 116 and one slave unit 120 are connected to the bus 130. The slave unit 120 is in this case a peripheral unit. In the present example, the master units 110 . . . 116 are designed as master/slave units and have a master/slave interface M/S I/F in each case.

In the present example, the first master unit 110 is a memory unit. The master unit 111 is a processor unit, for example a central processing unit (CPU) or an RISC processor. The master unit 112 is a further processor unit, for example this processor unit can be formed by a coprocessor. The master unit 113 is a peripheral unit. The master unit 114 is in this case a DMA unit (Direct Memory Access). The master unit 115 is a bus bridge unit which is connected to an external bus 101 in this case. The master unit 116 represents an external bus control unit. The external bus control unit 116 thus forms the interface between the internal bus 130 and an external connected bus (not shown here). Control of the data transmission via the bus 130 and control and arbitration of the units 110 . . . 116, 120 connected to the bus 130 are carried out by a bus control unit 140.

Figure 4:
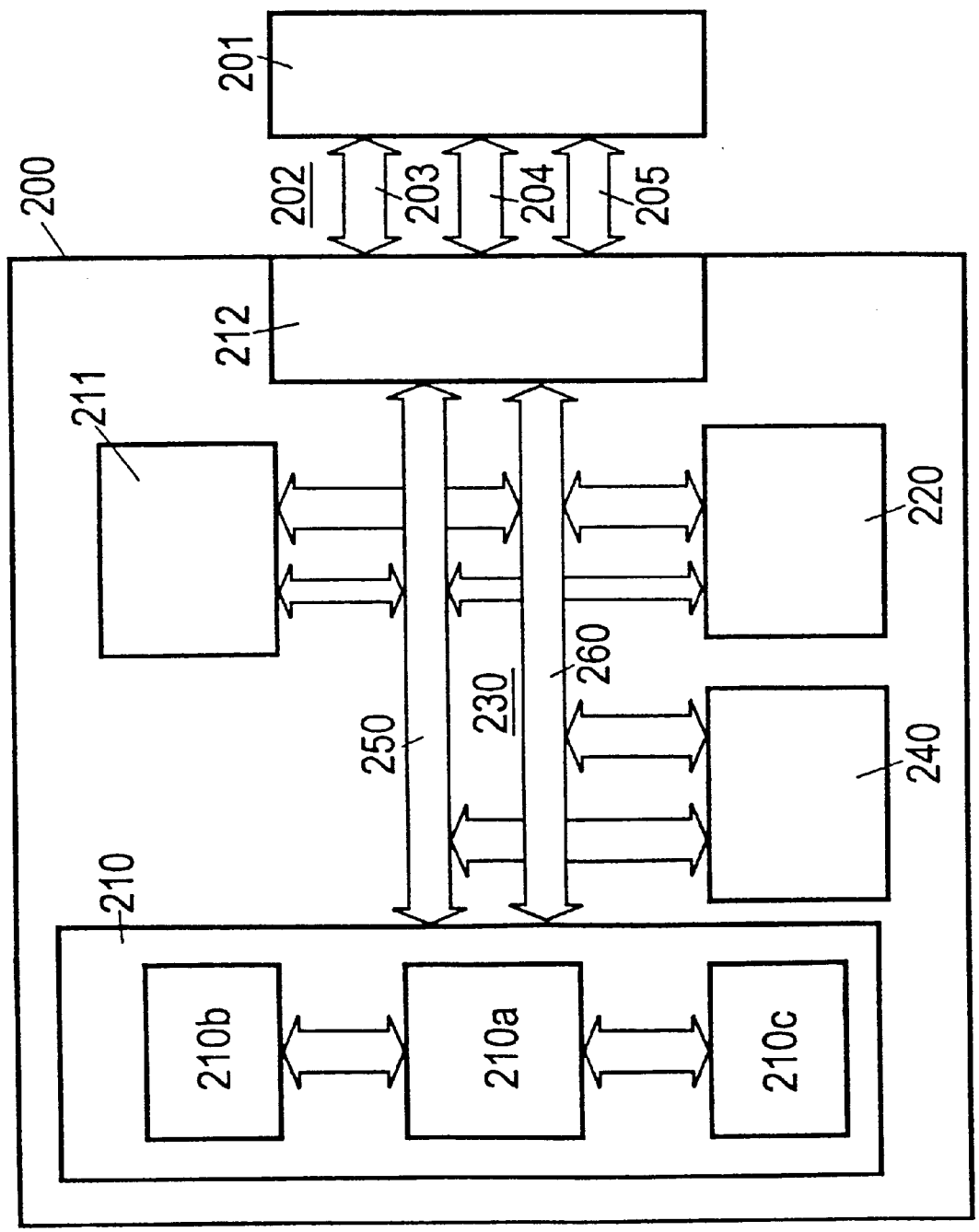
FIG. 4 shows a further advantageous exemplary embodiment for implementing the bus system according to the invention.

FIG. 4 shows a further advantageous exemplary embodiment of the implementation of the bus system according to the invention.

200 denotes an integrated circuit here. The integrated circuit 200 contains a bus 230. The bus 230 contains an address bus 250 and a data bus 260. The remaining control lines of the bus 230 are shown here only schematically and are not numbered further. In the example of FIG. 4, three master units 210 . . . 212 and a slave unit 220 are connected to the bus 230. The slave unit 220 is formed by a peripheral unit in this case.

The master unit 210 is formed by the central processing unit. The central processing unit contains a core device 210a. An address register 210b and a data register 210c are connected to the core device 210a by means of signal lines which are operated bidirectionally. The master unit 211 is a memory device which can be formed, for example, by an on-chip memory or a so-called embedded memory. This memory device 211 can be designed as RAM, ROM, SRAM etc. It would also be conceivable for the memory 211 to be designed as a buffer memory device. The master unit 212 is designed as an external bus controller.

Bus control of the internally configured bus 230 is performed by the bus control unit 240. The external bus control unit 212 forms the interface between the internal bus 230 and an external bus 202. The external bus 202 has an address bus 203, a data bus 204 and a control bus 205. The external bus can connect the semiconductor component 200 to external units, such as an external memory 201 or the like.

The invention is particularly advantageous when used in a microprocessor or microcomputer.

We claim:

1. A method of operating a bus system, wherein the bus system has at least one primary unit, at least one secondary unit, at least one bus control unit, and a bus between the at least one primary unit and the at least one secondary unit, the bus having at least one address bus, at least one data bus and at least one control line, the method which comprises:

defining a first data transmission configuration between the at least one primary unit and the at least one secondary unit, splitting a data transmission into a request data transfer and a response data transfer in the first data transmission configuration, and clearing the bus for data transmissions of other primary units and secondary units in a time between the request data transfer and the response data transfer;

defining a second data transmission configuration between the at least one primary unit and the at least one secondary unit, blocking the bus between the request data transfer and the response data transfer in the second data transmission configuration; and controlling a data transmission between the at least one primary unit and the at least one secondary unit, addressed by the at least one primary unit, by selectively transmitting data in the first and second data transmission configurations.

2. The method according to claim 1, wherein the step of transmitting data in the request data transfer in the first data transmission configuration comprises:

addressing the at least one secondary unit, with the at least one primary unit allocated for bus access as a master; and requesting, with the at least one primary unit, a data transfer from the addressed at least one secondary unit, and wherein the step of transmitting data in the response data transfer in the first data transmission configuration comprises:

at least partially collecting the data set intended for the response data transfer by using the addressed secondary unit; and sending the collected data set to the at least one primary unit having requested the data transfer, by using the at least one secondary unit as a master.

3. The method according to claim 1, wherein the at least one control line is one of a plurality of control lines, the method further comprises:

specifying with the at least one primary unit that the data transmission is carried out in the first data transmission configuration, by using a configuration signal on at least one of the control lines.

4. The method according to claim 1, wherein the at least one control line is one of a plurality of control lines, and wherein the method further comprises:

selectively rejecting a data transfer, specified by the at least one primary unit, with the at least one secondary unit, in one of the first data transmission configuration and the second data transmission configuration, by using a configuration signal on at least one of the control lines; and performing the data transfer, with the at least one secondary unit, in at least one of the second and the first data transmission configuration.

5. The method according to claim 1, wherein the at least one control line is one of a plurality of control lines, and wherein the method further comprises:

enforcing a data transfer selectively in one of the data transmission configurations, by the at least one primary unit using a configuration signal on at least one of the control lines.

6. The method according to claim 1, wherein the at least one primary unit is one of a plurality of primary units, the method further comprises:

simultaneously carrying out a maximum of one data transmission with each of the primary units.

7. The method according to claim 1, wherein the at least one primary unit is one of a plurality of primary units, the method further comprises: controlling the allocation of the bus to one of the primary units with the bus control unit.

8. The method according to claim 1, which further comprises:

transmitting data in the second data transmission configuration during wait states.

9. The method according to claim 1, which further comprises:

processing bus operations of an address cycle and a data cycle by using a pipelining method.

10. The method according to claim 1, wherein the at least one control line is one of a plurality of control lines, the method further comprises:

preventing a write access to a register of the at least one secondary unit involved in a data transmission when read access is occurring, by using a protection bit on at least one of the control lines.

11. The method according to claim 1, wherein the at least one control line is one of a plurality of control lines, the method further comprises: specifying a data length transmitted, by using a control signal on at least one of the control lines.

12. The method according to claim 1, wherein the at least one control line is one of a plurality of control lines, the method further comprises:

specifying the mode in which the at least one primary unit accesses the bus, by using a control signal on at least one of the control lines.

13. The method according to claim 1, wherein the at least one control line is one of a plurality of control lines, the method further comprises:

acknowledging a data transmission by the at least one secondary unit using an acknowledge signal on at least one of the control lines.

14. The method according to claim 1, wherein the at least one control line is one of a plurality of control lines, the method further comprises:

selectively indicating whether data are available for processing and whether data are currently processed, by the at least one secondary unit using a status signal on at least one of the control lines.

15. The method according to claim 1, wherein the at least one control line is one of a plurality of control lines, the method further comprises:

selectively indicating whether any wait states are inserted and how many wait states are inserted, by the at least one secondary unit using a status signal on at least one of the control lines.

16. The method according to claim 1, wherein the at least one control line is one of a plurality of control lines, the method further comprises:

selectively indicating whether successive bus cycles have been carried out without interruption and whether any error states have occurred, by the at least one secondary unit using a status signal on at least one of the control lines.

17. The method according to claim 1, wherein the at least one control line is one of a plurality of control lines, the method further comprises:

aborting a data transmission after a predetermined time, by the bus control unit using an abort signal on at least one of the control lines.

18. The method according to claim 1, wherein the at least one primary unit is one of a plurality of primary units and the at least one control line is one of a plurality of control lines, the method further comprises:

specifying an allocation of the primary units to the bus, by the bus control unit using a request signal and a grant signal on at least one of the control lines.

19. A circuit arrangement for operating a bus system, comprising:

at least one primary unit;

at least one secondary unit;

a bus between said at least one primary unit and said at least one secondary unit having at least one address bus, at least one data bus and at least one control line;

at least one bus control unit controlling said bus and controlling a data transmission between said at least one primary unit, allocated to said bus, and said at least one secondary unit, addressed by said at least one primary unit, the data transmission being carried out selectively in one of a first data transmission configuration and a second data transmission configuration, the data transmission being split into a request data transfer and a response data transfer in the first data transmission configuration, and said bus being cleared for data transmissions of other primary units and secondary units in a time between the request data transfer and the response data transfer, said bus being blocked between the request data transfer and the response data transfer in the second data transmission configuration; and a logic circuit in said at least one primary unit and said at least one secondary unit linked to the bus system, for requesting, rejecting, and selecting the data transmission selectively in one of the first and second data transmission configurations.

20. The circuit arrangement according to claim 19, including:

a timer for timing the data transmission in the first data transmission configuration provided in both of said at least one primary unit and said at least one secondary unit.

21. The circuit arrangement according to claim 19, including:

at least one buffer memory device in said at least one secondary unit.

22. The circuit arrangement according to claim 21, wherein said buffer memory device has a memory size at least large enough to deal with a data transfer at an optimum rate.

23. The circuit arrangement according to claim 19, including:

at least two primary units; and a prioritizer for specifying the priority of said primary units accessing said bus, said prioritizer provided in said bus control unit.

24. The circuit arrangement according to claim 19, wherein said at least one primary unit is one of a plurality of primary units, said circuit arrangement including:

a master/slave interface provided in at least one of said primary units.

25. The circuit arrangement according to claim 19, including:

said bus operable to transmit addresses selectively in one of a non-multiplexed mode on said address bus, and in a multiplexed mode on said address bus and said data bus.

26. The circuit arrangement according to claim 19, including:

at least one central processing unit provided in said at least one primary unit.

27. The circuit arrangement according to claim 19, wherein said at least one primary unit is one of a plurality of primary units, said circuit arrangement including:

one of said primary units provided as a default master, said default master allocated to said bus if no other primary unit requests said bus.

28. In a microprocessor, a circuit arrangement for operating a bus system, comprising:

at least one primary unit;

at least one secondary unit;

a bus between said at least one primary unit and said at least one secondary unit having at least one address bus, at least one data bus and at least one control line;

at least one bus control unit controlling said bus and controlling a data transmission between said at least one primary unit, allocated to said bus, and said at least one secondary unit, addressed by said at least one primary unit, the data transmission being carried out selectively in one of a first data transmission configuration and a second data transmission configuration, the data transmission being split into a request data transfer and a response data transfer in the first data transmission configuration, and said bus being cleared for data transmissions of other primary units and secondary units in a time between the request data transfer and the response data transfer, said bus being blocked between the request data transfer and the response data transfer in the second data transmission configuration; and a logic circuit in said at least one primary unit and said at least one secondary unit linked to the bus system, for requesting, rejecting, and selecting the data transmission selectively in one of the first and second data transmission configurations.

29. In a microcomputer, a circuit arrangement for operating a bus system, comprising:

at least one primary unit;

at least one secondary unit;

a bus between said at least one primary unit and said at least one secondary unit having at least one address bus, at least one data bus and at least one control line;

at least one bus control unit controlling said bus and controlling a data transmission between said at least one primary unit, allocated to said bus, and said at least one secondary unit, addressed by said at least one primary unit, the data transmission being carried out selectively in one of a first data transmission configuration and a second data transmission configuration, the data transmission being split into a request data transfer and a response data transfer in the first data transmission configuration, and said bus being cleared for data transmissions of other primary units and secondary units in a time between the request data transfer and the response data transfer, said bus being blocked between the request data transfer and the response data transfer in the second data transmission configuration; and a logic circuit in said at least one primary unit and said at least one secondary unit linked to the bus system, for requesting, rejecting, and selecting the data transmission selectively in one of the first and second data transmission configurations.

* * * * *